United States Patent [19]

Molby

[11] 4,236,591

[45] Dec. 2, 1980

[54] OFF-ROAD VEHICLE THAT BOTH OSCILLATES AND ARTICULATES

[76] Inventor: Lloyd A. Molby, Box 7788, Longview, Tex. 75602

[21] Appl. No.: 934,586

[22] Filed: Aug. 17, 1978

[51] Int. Cl.³ .............................................. B60G 19/10
[52] U.S. Cl. ...................................... 180/41; 280/6 H
[58] Field of Search .......................... 180/41, 136, 139; 280/6 H

[56] References Cited

U.S. PATENT DOCUMENTS

| 3,384,196 | 5/1968 | Fielding | 180/139 |
| 3,976,302 | 8/1976 | Hammarstrand | 180/41 X |

Primary Examiner—John A. Pekar
Attorney, Agent, or Firm—Wofford, Fails & Zobal

[57] ABSTRACT

This specification discloses an off-road vehicle that both articulates and oscillates, thereby enabling achieving a highly maneuverable, more nearly level working platform from which attachments can be operated with utmost effectiveness. The vehicle is characterized by front and rear sections, each carried by two wheels and connected at an articulating steering joint with steering rams and steering means; and a mechanism on the front section for leveling the front section. The leveling mechanism includes a front frame member that supplies the main structural support for the front section and is pivotally connected with a front axle, with hydraulic rams disposed on either side of the pivotal connection and connected via control valve with a source of high pressure hydraulic fluid for attaining and holding a predetermined, or substantially level, position. In the preferred embodiments, a lock valve is interposed between the control valve and the hydraulic rams for providing a positive liquid lock to hold a predetermined position. Also disclosed are preferred embodiments.

1 Claim, 2 Drawing Figures

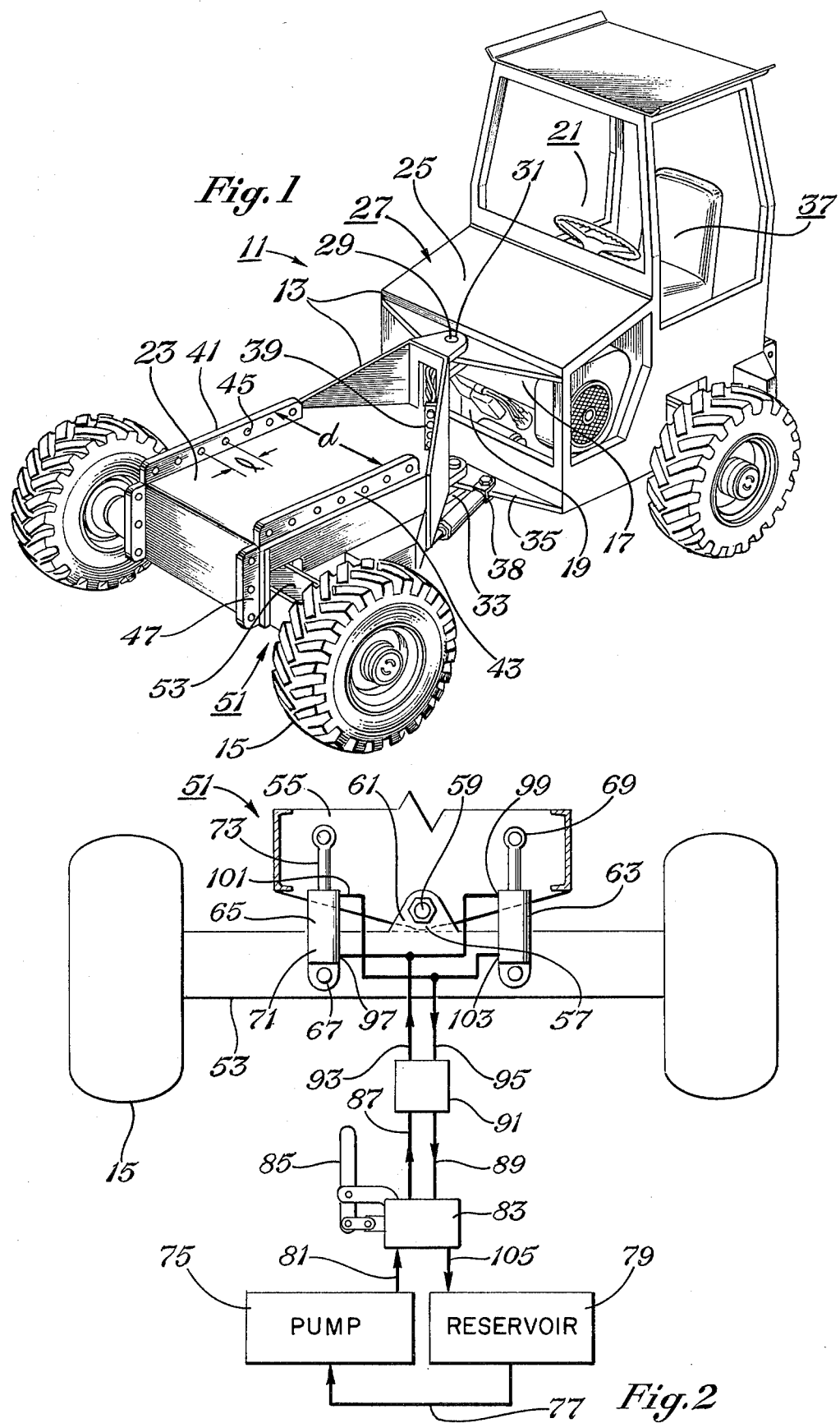

OFF-ROAD VEHICLE THAT BOTH OSCILLATES AND ARTICULATES

BACKGROUND OF THE INVENTION

1. Field of the Invention

This invention relates to a vehicle of the so called "off-road" type. More particularly, this invention relates to construction equipment including an adaptable off-road type vehicle that both oscillates and articulates facilitating its use in a wide variety of operations.

2. Description of the Prior Art

A wide variety of off-road type vehicles have been known in the prior art. Each type of vehicle has been expensive and not used fully, since it was ordinarily connected with a particular type of attachment. As described in my co-pending application entitled "Adaptable Combination of Vehicle and Attachments", Ser. No. 919,179, filed June 26, 1978, there is provided an adaptable expensive vehicle that can be used with a wide variety of attachments such as augers, dump beds, ditch digging equipment, back hoes, revolving jib cranes, fork lifts and the like to more fully utilize the vehicle. This type of flexibility in the wide variety of uses necessitates a vehicle that is highly flexible, highly maneuverable and the like. This demands a vehicle that will articulate to afford the high degree maneuverability and ease of steering; and also a vehicle that oscillates, or can attain a more nearly level, or horizontal, platform for operation of the attachments. This type of vehicle that both articulates and oscillates has not been available in the prior art, particularly having the features delineated hereinafter.

SUMMARY OF THE INVENTION

Accordingly, it is an object of this invention to provide an adaptable off-road vehicle that both oscillates and articulates, alleviating the deficiencies of the prior art.

It is a specific object of this invention to provide a vehicle having front and rear sections that are connected about a vertical articulation axis to enable highly maneuverable steering; and that can be tilted with respect to the terrain, or wheels of the vehicle, to attain a more nearly level platform for most effective operation of one or more attachments connected to the vehicle.

These and other objects will become apparent from the descriptive matter hereinafter, particularly when taken in conjunction with the appended drawings.

In accordance with this invention there is provided an adaptable off-road vehicle that includes: (a) a frame carrying a prime mover and drive means, an operators console and control for controlling movement of the vehicle and power means for operating attachments; (b) a plurality of at least four wheels carrying the frame; (c) steering means for steering the vehicle; the improvement comprising means for affecting both articulation and oscillation of the vehicle and including: (d) having the frame formed into two sections, including a first section and a second section, with an articulation joint including a vertical interconnection and steering rams disposed a distance from the pivotal interconnection enabling operator control of the articulation; (e) attach-means on the first section for mounting the attachments; and (f) a leveling means on the first section operable to effect a predetermined angular position with respect to a straight line between the wheels carrying the first section; and control disposed in the operators console and connected with the leveling means and the power means for enabling operator control of the oscillation whereby the first section can be positioned more nearly level than otherwise. In specific embodiments, the level means includes hydraulically operable rams and the power source includes a hydraulic pump for supplying high pressure hydraulic fluid, and the control includes a hydraulic fluid flow control valve for effecting and holding the predetermined position with a liquid lock.

BRIEF DESCRIPTION OF THE DRAWINGS

FIG. 1 is an isometric view of an adaptable off-road vehicle in accordance with this invention.

FIG. 2 is a schematic view of the front section of the vehicle of FIG. 1, showing schematically the hydraulically operable leveling means.

DESCRIPTION OF PREFERRED EMBODIMENTS

This invention can be understood more clearly by referring to the figures in conjunction with the following descriptive matter. Referring to FIG. 1, the adaptable off-road vehicle 11 has its frame 13 mounted on wheels 15. The frame 13 carries a prime mover 17 for powering the vehicle 11 and driving a power means, or power source, 19 for power in operating respective attachments. A steering means 21 is provided for steering the vehicle.

The vehicle 11 comprises a plurality of sections, including a first, or front, section 23 and a second, or rear, section 25. The vehicle 11 in the illustrated embodiment is an articulated vehicle, articulating about a central vertical axis interconnection 27. The axis interconnection 27 comprises a plurality of pins 29 inserted through respective apertures 31 in the respective clevices 33 emplaced over the steering lug 35 with the apertures in alignment for receiving the pins 29.

The frame 13 is formed of suitably strong structural materials, such as steel or the like, that has been welded into place to support the respective elements in accordance with conventional engineering technology in this art. The rear section 25 encloses the operators console 37 having usual controls, seat and the like.

The respective wheels 15 may comprise any of the usual types of wheels. As illustrated, they include hydraulic motor driven wheels with tires around the periphery. The hydraulics are connected with suitable controls, pump and reservoir in a hydrostatic system having at least conventional forward and rearward operating capability. The four wheels 15 are employed for supporting in a very stable manner each of the four corners of the frame 13.

The prime mover 17 is an internal combustion engine; specifically, a diesel in the illustrated embodiment. It drives the power means which comprises a pair of hydraulic pumps supplying high pressure hydraulic fluid for the hydrostatic drive system, as well as a hydraulic system for powering the respective attachments.

Steering means 21 comprises the usual steering wheel and hydraulic ram, such as ram 38 that is fluidly connected with the steering means 21 and operable to effect articulation of the frame 13 about the central vertical axis 27.

Expressed otherwise, the basic vehicle 11 is a tractor that has a four-wheel drive and articulated power unit and is adapted to use remotely operated, hydraulically powered tools, or attachments, whether they are fastenable to the machine or used remotely therefrom. The hydraulic power unit can accommodate high pressure circuits of from 2 gallons a minute up to 8 gallons a minute on one auxiliary system and 6 gallons a minute to 26 gallons a minute in the main hydraulic circuits for driving the attachments. The vehicle 11 has plug-in quick-connect hydraulic circuit fittings 39 that enable the hydraulic lines on the respective attachments to be plugged in, in the same way that an electric cord may be plugged into a wall socket. The respective receptacles and plugs have respective valves immediately adjacent the ends for preventing unwanted flow when the fittings are unplugged. This facilitates hydraulic interconnection of the respective attachments such that both they and the hydraulic circuits on the vehicle remain filled with hydraulic fluid.

The illustrated embodiment of the vehicle is available in either standard or heavy duty versions. The vehicle will handle up to about 5,000 pounds on the fork lift attachment. As illustrated, the wheels on the heavy duty version employs tires that are 19 inches wide. The vehicle steers 90° total articulation, 45° on either side of the longitudinal axis of the aligned sections.

As described in the aforementioned patent application Ser. No. 919,179, the descriptive matter of which is incorporated herein by reference for details that are omitted herefrom, respective first and second portions of attachment means may be employed to facilitate mounting of the respective attachments. A typical first portion 41 is illustrated. As illustrated the respective first portion 41 comprises respective tracks 43 that are spaced a predetermined distance d apart so as to mount clevices on the attachments. Suitable apertures 45 are spaced a predetermined distace l apart along the respective tracks 43 so as to form mounting lugs, or mounting stations, for mounting the attachments. Vertical track means 47 are provided similarly for mounting attachments on the front of the vehicle 11. One particular advantage and feature of this vehicle 11 is the combination of the articulation feature for high maneuverability and the oscillation means, or leveling means, 51, FIGS. 1 and 2. The front wheels 15 are connected laterally by an axle 53.

Pivotally carried by the axle 53 is a main structural frame member 55, called the front frame member, FIG. 2. The front frame member 55 supports the platform of the front section 23. The front frame member 55 and the axle member 53 are pivotally connected together at a pivot joint 57 near their respective midpoints. The pivot joint 57 may be formed by a pin 59 inserted through apertures through mounting lugs 61 and the front frame member 55. The mounting lugs 61 are affixed to the axle 53, as by welding.

The leveling means 51 includes two hydraulic rams 63, 65 that are connected with the front frame member 55 and the axle 53 on the right and left sides at predetermined lateral distances from the pivot joint 57. As illustrated, the respective hydraulic rams 63, 65 are connected with the axle at respective pivot joints, such as pivot joint 67. Pivot joint 67 may comprise a pin shaft having disposed thereabout and connected therewith a connecting rod end, or head, such as a bolted connecting rod end. The connecting rod end is shown connected with the cylinder portion of the hydraulic ram. The respective hydraulic rams are connected via their extensible rod, with pivot joints 69. The pivot joints 69, similarily, may be comprised of a pin shaft, such as formed by a bolt or the like in combination with a surrounding rod end, or head. If desired, of course, the pivot joints may employ bushings or the like between the shaft and rod end to facilitate the respective pivotal motion without excessive wear and to facilitate repair. Of course, the hydraulic rams can be physically connected upside down from the illustrated connections, if desired. As implied hereinbefore, each ram comprises a cylinder 71 and an extensible rod 73 with suitable interior piston connected with the rod so as to extend or retract the rod responsive to hydraulic pressure on the respective side of the piston (the piston being inside the cylinder 71 and not shown). The respective hydraulic rams 63 and 65 are fluidly connected with the source of high pressure hydraulic fluid and a control for positioning the front frame member 65 at a predetermined angle with respect to the axle 53.

Referring to FIG. 2, the power source includes a hydraulic pump 75 that is connected by a suction line 77 with a hydraulic fluid reservoir 79. The suction line 77 may be low pressure hydraulic fluid hose. The pump 75 is connected via high pressure hydraulic hose, or hydraulic line 81 with a control, such as the control valve 83. The control valve 83 is an open center valve with locked ports such that the desired degree of tilting may be effected by moving the control handle 85. One a desired position is attained, the control handle 85 is moved to the neutral position to hold the predetermined and attained position.

The control valve 83 is connected via high pressure hydraulic lines 87, 89 with a lock valve 91. The lock valve 91 prevents any hydraulic bleed-off and insures a solid liquid lock for holding an attained position. The lock valve 91 is connected via high pressure hydraulic line, such as the high pressure hydraulic hoses 93, 95 with the respective connections for tilting right or tilting left with respect to the front axle 53. Specifically, the hydraulic line 93 is connected with the cylinder port 97 of the hydraulic ram 65 and with the rod port 99 of the hydraulic ram 63 for forcing a tilt to the right. In converse manner, the hydraulic line 95 is connected with the rod port 101 of the ram 65 and with the cylinder port 103 of the ram 63 for forcing a tilt to the left. Of course, when the high pressure fluid is directed into the line 93 and in the respective connected ports, low pressure fluid is vented to be returned via lines 95 and 89 to the hydraulic reservoir 79. The hydraulic reservoir 79 is connected with the control valve 83 through the low pressure hydraulic line 105. The respective connections of the respective lines with the elements are designed to hold the pressure that will be exerted thereon. Ordinarily, high pressure hydraulic line connectors may be connected with threaded nipples on the end of suitable fittings on the respective valves and rams.

In operation, a given attachment will be mounted on the tracks 41 and driven to the site using appropriate controls, steering and the like. At the operating site, the front section 23 will be leveled by the operator. Specifically, the handle 85 will be pushed or pulled in the appropriate direction to tilt the front frame member 55 to the right with respect to the axle 53 (or to the left, as the case may be). Specifically, if tilting to the right is to be done, the control handle 85 is moved to send high pressure fluid through the line 87, lock valve 91 and line 93 to force the piston upwardly in the ram 65, extending the rod 73. Simultaneously, high pressure hydraulic fluid is sent to the rod port 99 to move the piston downwardly in the ram 63 and pivot the front frame member clockwise in FIG. 2 about the pivot joint 57, effecting a tilt to the right with respect to the axle 53. This allows attaining a substantially horizontal platform, within the limits of operation, for most effective operation of the attachment mounted on the front section 23. When the handle 85 is returned to the neutral position, as by spring loading or manual return, the lock valve 91 locks the hydraulic fluids to afford a positive fluid lock and hold the attained angle.

Conversly, when the tilt is to be to the left, high pressure hydraulic fluid is fed through the line 89 and lock valve 91 and line 95 to effect a tilt to the left. When the control handle 85 is moved to the neutral position, a positive lock is afforded by the lock valve 91 and the attained tilt to the left is retained.

When it is desired to return to the same or another location, the control handle is moved to place the front frame member 55 substantially parallel to the axis 53 when driving on level roads or the like.

Many of the hydraulic hoses and interconnections are not shown on the vehicle 11 in the interest of simplicity and since this involves state of the art technology.

The usual materials of construction are employed in fabricating the vehicle, the attachments, and the leveling means described herein. Ordinarily, steels are preferred in the strong structural parts because of their strength and ready amenability to the various operations; such as welding, milling and casting.

It can be seen that this invention allows providing a more nearly horizontal platform from which to operate a particular attachment than would otherwise be possible. Moreover, because of the articulation in combination with the oscillation, the high degree of maneuverability and flexibility of the vehicle 11 provides a machine that can be used more fully in a wide variety of working conditions and with a wide variety of different attachments.

Thus, it can be seen that the objects delineated hereinbefore are provided by this invention.

While the invention has been described with a certain degree of particularity, it is understood that the present disclosure has been made only by way of example and numerous changes in details of the structure and the combination and arrangement of parts may be resorted to without departing from the spirit and scope of the invention, reference being had to the appended claims for that purpose.

What is claimed is:

1. In an off-road vehicle that includes:
   a. a frame carrying a prime mover and driving means, an operator's console and controls for controling movement of said vehicle and power means for operating attachments;
   b. a plurality of four wheels carrying said frame;
   c. means for steering said vehicle;

the improvement comprising means for effecting both articulation and oscillation of said vehicle and including:
   d. having said frame formed in two sections including a first section and a second section with an articulation joint including a vertical axis interconnection and at least one steering ram disposed laterally from said axis interconnection and between the sections for enabling the operator control of the articulation of said vehicle; each section being carried by two of said four wheels; said first section being a front section with a front frame member, said two wheels carrying said front section being laterally connected by a front axle;
   e. attachment means on said first section for mounting an attachment for performing work by said vehicle;
   f. leveling means on said first section and operable to effect a predetermined angular position with respect to said front axle; said leveling means including a pivotal interconnection between said front axle and said front frame member near their respective midpoints; said leveling means thereby effecting oscillation of said vehicle and enabling effecting a more nearly level platform as signaled by the operator for most effective operation of said attachment;
   g. controls disposed in said control console and connected with said leveling means and said power means for enabling operator control of said oscillation such that said first section can be kept at substantially the operators desired angular position;
   h. hydraulic reservoir;
   i. said power means including a hydraulic pump connected with said hydraulic reservoir via conduits;
   j. a pair of hydraulic rams physically connected with said front axle and said front frame member respectively, on respective right and left sides of said pivotal interconnection at respective predetermined distances;
   k. a hydraulic flow control valve included in said controls for controlling flow of hydraulic fluid to and from said hydraulic rams as the operator may direct; said hydraulic flow control valve being connected by high pressure fluid conduit with said hydraulic rams and said hydraulic pump and by fluid conduit with said hydraulic reservoir; said distances and said hydraulic rams being selected such that said front frame member can be tilted to obtain said predetermined angular position with respect to said axle; and
   l. a lock valve being interposed between said hydraulic flow control valve and said hydraulic rams for providing a positive liquid lock for retention of said front frame member in a predetermined attained position and preventing leaking of hydraulic fluid from hydraulic rams holding it in said position until said lock valve is unlocked by said hydraulic flow control valve and hydraulic pressure from said pump.

* * * * *